May 19, 1970  E. W. SUNDSTRÖM ET AL  3,513,315
SYSTEM FOR DETERMINING THE DISPLACEMENT OF AN
OBJECT FROM A LINE OF SIGHT
Filed Nov. 7, 1967  5 Sheets-Sheet 1

INVENTORS
ERIK WILHELM SUNDSTRÖM
SVEN TORSTEN LIND
BY
Hane and Baxley
ATTORNEYS

INVENTORS
ERIK WILHELM SUNDSTRÖM
SVEN TORSTEN LIND

3,513,315
SYSTEM FOR DETERMINING THE DISPLACEMENT OF AN OBJECT FROM A LINE OF SIGHT
Erik Wilhelm Sundstrom and Sven Torsten Lind, Karlskoga, Sweden, assignors to Aktiebolaget Bofors, Bofors, Sweden
Filed Nov. 7, 1967, Ser. No. 681,178
Claims priority, application Sweden, Nov. 14, 1966, 15,518/66
Int. Cl. G01j *1/20;* H01j *3/14, 39/12*
U.S. Cl. 250—203         22 Claims

ABSTRACT OF THE DISCLOSURE

A system for determining by use of visible or infrared light the displacement of an object from a line of sight extending from a remote reference point, in which from the reference point a beam of light is emitted so as to nutate conically about the line of sight without rotating about its own axis. Adjacent the object of the beam of light produces an image of a pattern consisting of luminous and dark portions and having a geometry, which is rotationally unsymmetric about a centre in the pattern and defines at least two radial directions from the centre of the pattern, which directions are displaced 180° from each other. A photocell is mounted on the object for producing an output signal pulse modulated in dependence of the movement of the pattern relative to the photocell and this output signal is analysed for determining the time intervals between the instants when said directions in the pattern pass the photocell, said time intervals being representative of the displacement of the object. By using a pattern having a geometry defining at least also a third radial direction from the centre of the pattern, said third direction being displaced 90° from said first and second directions, it is possible to determine from the pulsed output of the photocell the displacement of the object in two mutually perpendicular directions from the line of sight. By mounting a second photocell on the object spaced from the first photocell and measuring the time intervals between the instants when a predetermined direction in the pattern passes the two photocells it is possible to determine also the distance between the object and the reference point.

FIELD OF THE INVENTION

This invention relates to a system for determining the displacement of an object from a line of sight extending from a point, in the following called the reference point, which is located remote from the object, by the use of radiant energy and more particularly radiant energy in the visible or the adjoining infrared or ultraviolet portions of the radiant energy spectrum. The displacement of the object can be determined either only in one direction, as for instance in azimuth or elevation, or in two mutually perpendicular directions, as for instance in azimuth as well as elevation. The object can be stationary or movable and for instance consist of a vessel, a movable ground vehicle, or a flying object, as for instance an aircraft or a missile. If the object is movable, the information obtained by the system according to the invention regarding the displacement of the object from the line of sight can be used for guiding or controlling the object either manually or automatically in such a way that the object is caused to follow the line of sight. The reference point from which the line of sight extends can be stationary or movable. In a preferred embodiment of the invention it is possible to determine also the distance from the reference point to the object.

DESCRIPTION OF THE PRIOR ART

Systems are known in the art for determining the displacement of an object, in particular a flying object, from a line of sight by the use of visible or infrared light. In these prior art systems the object must be radiant in itself or provided with a light source. In the reference point there is a telescope device, the direction of which determines the direction of the line of sight. This telescope device comprises a stationary or in some cases rotating reticle provided with a pattern of transparent and opaque portions, a photocell responsive to the light passing through the reticle, and an optical system, which focuses an image of the light source of the object upon the reticle and the axis-of-vision of which is made to perform a circularly conical nutation about the line of sight, whereby the image of the light source of the object is moved across the reticle along a path determined by the displacement of the object from the line of sight. Consequently, the photocell produces an output signal, which varies in dependence of the nutation and any possible rotation of the reticle itself and which can be analysed to obtain information about the displacemet on the object from the line of sight. These prior art systems have several inherent disadvantages. Thus, the object must either be radiant in itself or provided with a strong light source, which can be seen by the telescope device. In military applications, however, one does not generally wish to mount a strong light source on the object. Furthermore, the information regarding the displacement of the object from the line of sight is obtained at the reference point, whereas for an automatic guidance of the object this information is generally required at the object. Furthermore, the reticle patterns used in the prior art systems are disadvantageous in several respects. The prior art reticle patterns have such a geometry that the output signal from the photocell comprises a basic component or carrier wave, the frequency of which is determined by the rate of nutation, and an information component, which is amplitude-, frequency- or phase-modulated on the basic component. The amplitude or the frequency of the information component is then dependent on the magnitude of the displacement of the object from the line of sight, whereas the phase of the information component relative to the basic component is dependent on the direction of the displacement. The analysing of the output signal from the photocell is consequently comparatively complicated and must be carried out by means of accurate and comparatively complicated filter devices. Such filter devices have always a considerable inherent delay, wherefore the process of determining the displacement of the object from the line of sight will be slow, that is the output from the system at a given moment will represent the displacement of the object from the line of sight at a moment sometime earlier or the average displacement of the object during some past period of time. Furthermore, it is not possible in the prior art systems to determine also the distance between the object and the reference point.

SUMMARY OF THE INVENTION

Accordingly, an object of the invention is to provide a new and improved system utilizing visible or infrared light for determining the displacement of an object from a line of sight extending from a point, the reference point, remotely located from the object, which system does not require that the object be radiant or provided with any source of light and in which the information regarding the displacement of the object is obtained at the object.

Another object of the invention is to provide a system of the type described, in which the compiling or evaluating means necessary for analysing the output signal of the photocell is simple and has a considerably smaller inherent delay, so that the value obtained at a given moment for the displacement of the object from the line of sight corresponds more accurately to the displacement of the object at said same moment.

A further object of the invention is to provide a system of the type described, by means of which it is possible to determine the displacement of the object either expressed as an angle of deviation as seen from the reference point or as the linear displacement of the object from the line of sight in a direction perpendicular to the line of sight, and by means of which it is possible at the same time to determine also the distance of the object from the reference point.

Still another object of the invention is to provide a system of the type described, in which the total amount of emitted light is small.

Characteristic for the system according to the invention is that it comprises a projector device disposed at the reference point for emitting a beam of light, which is circularly conically nutating about the line of sight but non-rotating about its own axis and which focuses at a distance substantially corresponding to the distance from the reference point to the object an image of a pattern consisting of luminous and dark portions. In a plane perpendicular to the line of sight this pattern will consequently perform a circular translatory motion having the line of sight as its centre. The pattern is rotationally unsymmetric about a centre in the pattern, for instance coinciding with a central ray in the emitted beam of light, and has a geometry defining or indicating at least a first and a second radial direction from the centre of the pattern, these first and second directions being displaced 180° from each other. The system according to the invention comprises also a photosensitive device, for instance, a photocell disposed on the object and facing the projector device for generating an output signal pulse modulated in dependence of the movement of the luminous and dark portions of the pattern across the photosensitive device, and a time measuring device responsive to the output signal for determining during one nutation the difference between the time interval from the instant when the first radial direction in the pattern passes the photosensitive device to the instant when the second radial direction in the pattern passes the photosensitive device and the time interval from this last-mentioned instant to the instant when the first radial direction in the pattern again passes the photosensitive device and for generating an output proportional to this difference. This output will be directly proportional to the displacement of the object from the line of sight in a direction perpendicular to the first and second radial directions in the pattern.

A further development of the invention makes it possible to determine the displacement of the object from the line of sight in two mutually perpendicular directions, for instance in azimuth as well as elevation. In this further development of the invention the pattern has a geometry defining also a third and a fourth radial direction from the centre of the pattern, these third and fourth directions being displaced 180° from each other and 90° from the first and second radial directions in the pattern, and a second time measuring device responsive to the output signal from the photosensitive device determines during one nutation the difference between the time interval from the instant when the third direction in the pattern passes the photosensitive device to the instant when the fourth direction in the pattern passes the photosensitive device and the time interval from this last-mentioned instant to the instant when the third direction in the pattern again passes the photosensitive device and generates an output proportional to the difference. This output from the second time measuring device will be directly proportional to the displacement of the object from the line of sight in a direction perpendicular to the third and fourth directions in the pattern.

In another variant of the system according to the invention, by means of which it is possible to determine the displacement of the object from the line of sight in two mutually perpendicular directions, for instance elevation and azimuth, the pattern has a geometry defining in addition to the first and second directions also a third radial direction from the centre of the pattern, which third direction is displaced 90° from the first radial direction as well as the second radial direction in the pattern. A second time measuring device responsive to the output signal from the photosensitive device determines during one nutation the difference between the time interval from the instant when the first radial direction in the pattern passes the photosensitive device to the instant when the third direction in the pattern passes the photosensitive device and the time interval from this last-mentioned instant to the instant when this second direction in the pattern passes the photosensitive device and generates an output proportional to the difference. This output from said second time measuring device will then be directly proportional to the displacement of the object from the line of sight in a direction perpendicular to said third direction in the pattern.

The various directions in the pattern image produced by the beam of light may be defined or indicated by the geometry of the pattern, either in that the pattern comprises border lines between dark and luminous portions, which border lines coincide with the directions in the pattern, or in that the pattern comprises narrow luminous sectors radially extending from the centre of the pattern in these directions. In the first case the various time intervals mentioned above are measured between the instants, when the border lines between luminous and dark portions in the pattern pass the photosensitive device, whereas in the second case the time intervals are measured between the instants, when the centre lines in the luminous sectors in the pattern pass the photosensitive device.

As previously mentioned, the time differences defined above will be directly proportional to the displacement of the object from the line of sight and more accurately to the angles of deviation from the line of sight as seen from the reference point, provided that the nutation angle, that is the angle between the line of sight and the central ray in the emitted nutating beam of light, remains constant. According to one embodiment of the invention, however, the projector device can be provided with means for variation of the nutation angle in inverse proportion to the distance from the reference point, that is, the projector device, to the object, in which case the time differences defined in the foregoing will become directly roportional to the linear displacement of the object from the line of sight expressed in units of length.

By a further development of the invention it is possible to determine at the same time also the distance of the object to the reference point. In this further development of the invention a second photosensitive device, for instance a photocell, is disposed on the object spaced from the first photosensitive device in such a manner that the line connecting the two photosensitive devices is perpendicular to one of the radial directions defined by the geometry of the pattern, and an additional time measuring device responsive to the output signals from both photosensitive devices determines during one nutation the length of the time interval between the instants when this direction in the pattern passes the two photosensitive devices and generates an output proportional to the inverse value of the time interval. The output from said additional time measuring device will be directly proportional to the distance from the object to the point of reference. According to still a further development of the invention the output from the additional time measuring device, which output is proportional to the distance from the reference point to the object, is supplied to the first and the second time measuring device respectively, which are responsive only to the output signal from the first photosensitive device and evaluate the displacement of the object from the line of sight. These first and second time measuring devices are then adapted to produce output quantities which are proportional to the products of the time differences determined by these time measuring devices and the output from the additional time measuring device. These products will be directly proportional to the linear displacement of the object from the line of sight as expressed in units of length, if the nutation angle is maintained constant.

BRIEF DESCRIPTION OF THE DRAWING

In the following the principles and further characteristic features of the invention will be described in detail with reference to the accompanying drawing, which shows by way of example a number of embodiments of the invention. In the drawing.

DESCRIPTION OF THE PREFERRED EMBODIMENTS

Figures 1, 2:
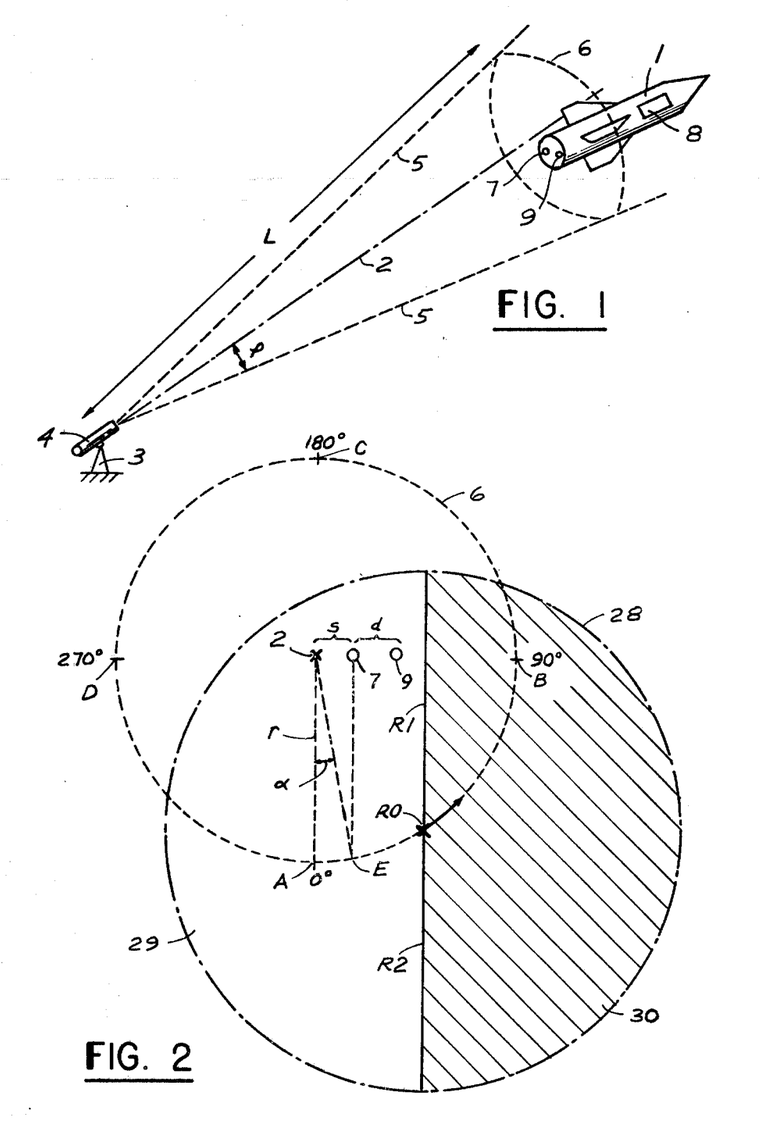
FIG. 1 shows schematically the general lay-out of a system according to the invention as used for determining the displacement of a missile from a line of sight extending from a fixed point on the ground.
FIG. 2 shows the geometry of a pattern, which makes it possible to determine the displacement of the object in azimuth from the line of sight and, if desired, at the same time also the distance of the object from the reference point, and illustrates also the interaction between the nutating pattern image and the photocells on the object.

FIG. 1 shows in principle the general lay-out or build-up of a system according to the invention for determining the displacement of a missile 1, that is a flying object, from a line of sight 2 extending from a fixed reference point 3 on the ground. As mentioned in the foregoing, the invention can be used also for determining the displacement of a ground vehicle or a vessel from a line of sight extending from a reference point remotely located from the vehicle or the vessel, respectively. The general build-up of the system according to the invention will remain uneffected. Neither is the general build-up of the system according to the invention affected by whether the object is movable or not, whether only the azimuth displacement of the object, only its elevation displacement, or its azimuth displacement as well as its elevation displacement is to be determined.

The system comprises a projector device, generally indicated by 4, located in the reference point 3 and directed in the direction of the line of sight 2. The projector device emits a beam of light, which performs a circularly conical nutation about the line of sight 2 without rotating about its own axis and which has such a light distribution that it focuses at a distance from the projector device 4 substantially corresponding to the distance to the object 1 an image of a pattern consisting of dark and luminous portions. For the sake of simplicity, FIG. 1 does not show either of the emitted beam of light or the pattern image. The drawing shows, however, the conical surface 5, the nutation cone, along which the central ray in the emitted beam of light nutating about the line of sight 2 is moving. In planes perpendicular to the line of sight 2 the central ray in the beam of light moves along a circle 6 having its centre on the line of sight 2. As the emitted beam of light is non-rotating about its own axis, the pattern image produced will in planes perpendicular to the line of sight 2, perform a translatory circular motion with the line of sight 2 as its centre. The nutation angle, that is the angle between the conical surface 5 and the line of sight 2, is indicated by $\varphi$. The distance between the reference point 3 and the object 1 is indicated by L.

The system according to the invention comprises also a photosensitive device 7 disposed on the object 1 and facing the projector device 4 so that it is illuminated by the luminous portions of the emitted beam of light, when these luminous portions cover the photosensitive device 7, which may consist of a photocell. Furthermore, there is a compilation or computer assembly, generally indicated by 8, which is responsive to the output signal from the photocell 7 and analyzes this output signal for determining the displacement of the object from the line of sight.

If also the distance of the object from the reference point 3 is to be determined, an additional second photocell 9 is mounted on the object 1 spaced in a predetermined manner from the first photocell 7, as will be described in detail in the following. The output signal from this second photocell is also applied to the compilation assembly 8, which from the output signals from both photocells 7 and 9 can determine the distance L from the object to the reference point.

Figure 11:
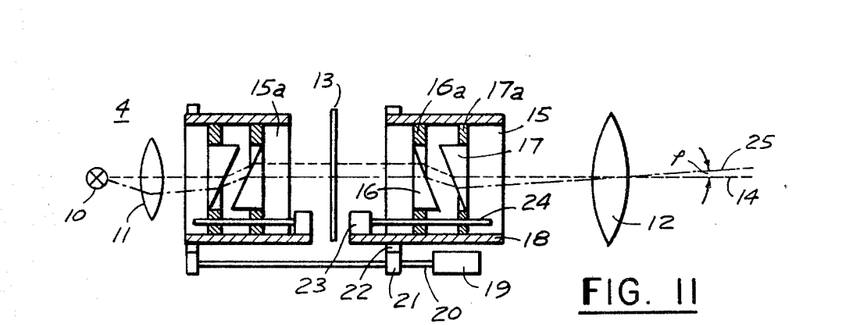
FIG. 11 shows schematically and partially in section an advantageous projector device for a system according to the invention.

FIG. 11 shows schematically and partially in section a preferable projector device 4. This projector device comprises a lamp 10, the light of which is collected by a condenser lens 11 so that an area with uniform illumination is achieved adjacent the condenser and so that an image of the light emitting parts of the lamp is produced in the diaphragm aperture of an objective lens 12. Within the zone of uniform illumination from the condenser 11 a stationary reticle disc 13 is disposed, which is divided in transparent and opaque portions forming the predetermined pattern, an image of which is to be produced adjacent to the movable object by means of the emitted light beam. The objective 12 has such a focal length that a sharp image of the pattern of the reticle 13 is produced at a distance substantially corresponding to the distance to the object, the displacement of which from the line of sight is to be determined. The emitted beam of light containing the pattern of the recticle 13 is nutated about the optical axis 14 of the objective 12, which axis coincides with the line of sight 2, (FIG. 1) by means of a prism assembly 15 disposed between the reticle 13 and the objective 12. This prism assembly comprises two triangular prisms 16 and 17, which are so disposed one after the other along the optical axis that their refracting surfaces are mutually parallel. The prisms are mounted in mounting rings 16a and 17a respectively, which are axially displaceable in a tube or sleeve 18. The tube 18 is rotatable about the optical axis 14 by a motor 19, which rotates the tube 18 via an axle 20 provided with a tooth wheel 21 and a tooth rim 22 on the tube 18. The mutual distance between the two prisms 16 and 17 can be varied by a motor 23 rotating a screw spindle 24, which has two portions threaded in opposite directions cooperating with threaded bores in the mounting rings 16a and 17a respectively for the prisms 16 and 17. The two triangular prisms 16 and 17 deflect together the central ray through the objective 12 in a direction parallel to the optical axis 14 of the objective so that the image of a point located at a distance from the centre point of the reticle 13 will be focused on the optical axis 14. As the two prisms 16 and 17 are rotated about the optical axis by the tube 18, this point will move in a circle about the centre of the reticle, the radius of the circle being dependent on the deflection of the prisms. The image of the centre point of the reticle will be focused in a direction 25 forming the nutation angle $\varphi$ with the optical axis 14 and rotating about the optical axis 14, when the prism assembly is rotated. The nutation angle can be varied by variation of the mutual axial distance between the two prisms 16 and 17 by means of the motor 23.

Between the retical 13 and the condenser 11 an additional prism assembly, generally indicated by 15a, is disposed. This second prism assembly is identical to the prism assembly 15 described in the foregoing. This additional second prism assembly 15a is not necessary for the nutation or the variation of the nutation angle but gives the additional advantage that it will be possible to use smaller lenses for the condenser 11 and the objective 12 without reduction of the strength of the projector. This is due to the fact that with two prism assembles 15 and 15a the central ray through the objective 12 will also be a central ray through the condenser 11.

As only those portions of the reticle 13 have to be illuminated, of which the objective 12 produces an image during the nutation, the intensity of illumination of said portions of the reticle 13 can be increased when the nutation angle is decreased, if the condenser 11 consists of a lens system with a variable focal length, which is reduced in proportion to the reduction of the nutation angle.

Figure 12:
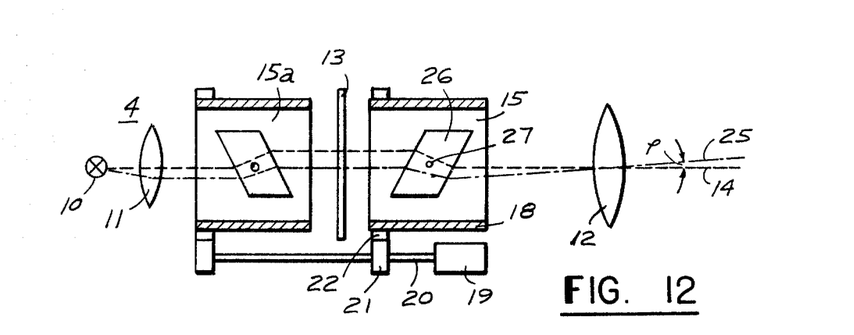
FIG. 12 shows schematically and partially in section another advantageous projector device.

FIG. 12 shows in the same way as FIG. 11 a second preferable embodiment of the projector device 4. Since many of the elements are the same as the elements of FIG. 12 the same reference numbers will be used for like elements and only the differences will be cited. This projector device is in principle designed in exactly the same way as the projector device shown in FIG. 11 with the only exception that the two triangular prisms 16 and 17 in the rotating prism assembly 15 are replaced by a plane parallel prism 26 having two, mutually parallel and axially spaced refracting surfaces forming an oblique angle with the optical axis 14 of the objective. For variation of the nutation angle the plane parallel prism 26 is mounted in the tube 18 so that it can be pivoted about an axis 27, which is perpendicular to the optical axis 14 and parallel to the refracting surfaces of the prism 26. The prism 26 can be rotated about the axis 27 by suitable means not shown in the drawing so that the nutation angle $\varphi$ is varied in a similar way as in the projector device shown in FIG. 11.

Although the projector devices shown in FIGS. 11 and 12 and described in the foregoing are very advantageous in a system according to the invention, it should be noted that any projector device can be used, by means of which it is possible to emit a beam of light conically nutating about a line of sight and focusing a pattern image consisting of luminous and dark portions at a substantial distance from the projector device. Furthermore, in certain embodiments of the system according to the invention it is not necessary that the nutation angle of the projector device can be varied. It should also be noted that the projector devices shown in FIGS. 11 and 12 and described above can be used with advantage also in other applications and connections, when a circularly conically nutating beam of light having a variable or adjustable nutation angle is to be emitted.

FIG. 2 shows the geometry of a reticle pattern, which is advantageous in a system according to the invention for determining only the horizontal displacement, that is the azimuth displacement of the object from the line of sight. When utilizing this reticle pattern it is possible to determine at the same time also the distance L of the object from the reference point. FIG. 2 illustrates the plane perpendicular to the line of sight 2, which contains the two photocells 7 and 9 on the object. For determining the azimuth displacement of the object only the photocell 7 is used and this is, in FIG. 2, shown located at a distance $s$ from the line of sight 2, that is the object is assumed to have a linear azimuth displacement $s$ to the right from the line of sight 2. The second photocell 9 is used only for determining the distance to the object. The photocell 9 is located at the same height as the photocell 7 and at a predetermined distance $d$ therefrom. The line connecting the two photocells 7 and 9 is consequently in this case horizontal. FIG. 2 shows also the circle 6, having the line of sight 2 as its centre, along which the central ray in the emitted, nutating beam of light is moving. In the plane illustrated in FIG. 2 the beam of light is assumed to be restricted by a circle 28. In the illustrated embodiment the pattern image produced by the beam of light consists of a luminous portion 29 and a dark portion 30 (hatched). The centre of the pattern, which is assumed to coincide with the central ray in the beam of light, is indicated by R0. The luminous portion 29 and the dark portion 30 in the pattern are separated by a straight, vertical border line through the centre R0 of the pattern. This border line can be regarded as defining or indicating a first radial direction R1 from the centre R0 of the pattern and a second also radial direction R2 from the centre R0 of the pattern, which second radial direction is displaced 180° from the direction R1. The radius of the nutation circle 6 is indicated by $r$. The direction of nutation is assumed to be counter-clockwise so that the pattern image performs a circular translatory counter-clockwise motion with the line of sight 2 as its centre and with the centre R0 of the pattern moving along the circle 6. A nutation revolution is considered to start, when the centre R0 of the pattern lies at the point A directly underneath the line of sight 2. When the centre R0 of the pattern is in the point B, 90° of a nutation revolution have passed. In the same way 180° of a nutation revolution have passed, when the centre R0 of the patent is in the point C, and 270° of the nutation revolution, when the centre R0 of the pattern lies in the point D. After one completed nutation revolution the centre R0 of the pattern returns to the point A.

Figure 3:
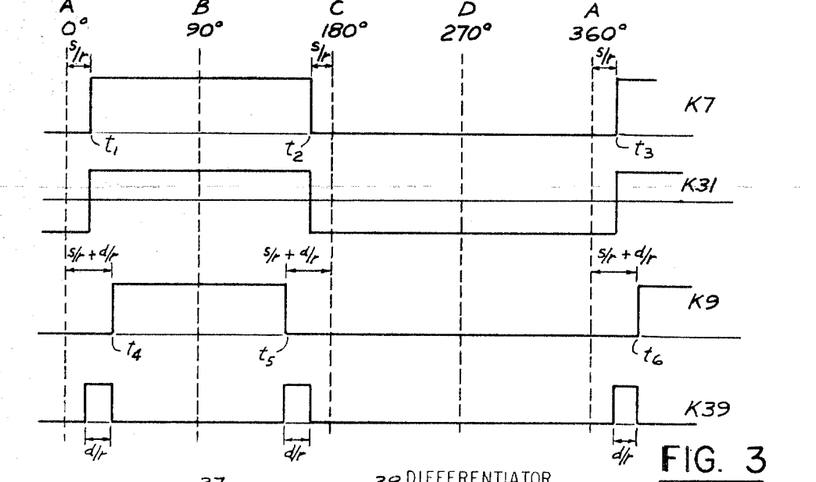
FIG. 3 is a waveform diagram showing the output signals from the photocells in an arrangement as illustrated in FIG. 2 and also the time intervals to be determined during one nutation for determining the displacement in azimuth of the object and the distance to the object respectively.

In FIG. 3 the waveform K7 illustrates the output signal from the photocell 7 during one nutation revolution. At the start of the nutation revolution, when the centre R0 of the pattern lies in the point A, the photocell 7 is covered by he dark portion 30 of the pattern image, wherefore the output signals from the photocell is zero. When the centre R0 of the pattern reachs th point E, the border line R1 passes the photocell 7 so that it becomes illuminated and an output signal is generated from the photocell. In FIG. 3 this instant is indicated by $t_1$. Thereafter the photocell 7 remains illuminated until the border line R2 in the pattern passes the photocell, which occurs at the instant $t_2$ (FIG. 3) immediately before the centre R0 of the pattern reaches the point C along the circle 6. Thereafter the photocell 7 remains unilluminated, until the border line R1 in the pattern once again during the following nutation revolution passes the photocell 7, which occurs at the instant $t_3$, FIG. 3.

As is obvious from FIG. 2, the pattern image has at the instant $t_1$ moved the angle $\alpha$ from the point A. Consequently one has $$\sin \alpha = s/r \tag{1}$$

If the displacement $s$ of the object from the line of sight is small as compared with the radius $r$ of the nutation circle 6, the above Expression 1 can be replaced by $$\alpha = s/r \tag{2}$$

As the rate of nutation is constant, one has also $$t_1 = \alpha/k_1 \tag{3}$$

in which $k_1$ is the constant rate of nutation expressed in units of angle per units of time. One has consequently $$t_1 = k_1 \cdot \frac{s}{r} \tag{4}$$

that is the time $t_1$ from the starting point of the nutation revolution is directly proportional to the azimuth displacement $s$ of the object from the line of sight 2.

In a similar way it can be shown that the instant $t_2$ is th time $k_1 s/r$ before the instant when the centre R0 of the pattern assumes the position C along the circle 6. The instant $t_3$ is of course determined in exactly the same way as the instant $t_1$.

According to the invention one determines or measures the difference between the time interval from the instant $t_1$ to the instant $t_2$ and the time interval from the last mentioned instant $t^2$ to the instant $t^3$, that is, the time difference $$\Delta t_s = (t_2 - t_1) - (t_3 - t_2) \tag{5}$$

From the above discussion and from FIG. 3 it is obvious that $$\Delta t_s = -4 k_1 \frac{s}{r} \tag{6}$$

that is the difference of time $\Delta t_s$ between the length of the illuminated and the unilluminated periods of the photocell 7 during one nutation revolution is directly proportional to the azimuth displacement $s$ of the object from the line of sight 2. The minus sign in the above Expression 6 indicates that the displacement is to the right. If the object is displaced to the left, the value of the quantity $\Delta t_s$ changes sign and becomes positive.

It is obvious that the value for the azimuth displacement of the object from the line of sight 2 obtained in the manner described above is in no way affected by the position of the object in vertical direction relative to the line of sight 2. The border lines R1 and R2 in the pattern will namely pass the photocell 7 at the same instants independent of the vertical position of the photocell, as these border lines are vertical and remain vertical during the circular translatory motion of the pattern about the line of sight 2.

The Expression 6 reveals that the time difference $\Delta t_s$ is not only dependent on the azimuth displacement $s$ of the object but also of the radius $r$ of the nutation circle 6. For the radius $r$ in the nutation circle one has (compare FIG. 1)

$$r = \varphi \cdot L \tag{7}$$

where $\varphi$ is the nutation angle and L is the distance from the object 1 to the reference point 3 from which the beam of light is emitted. The expression 6 is consequently transformed into $$\Delta t_s = -4 \frac{k_1}{\varphi} \cdot \frac{s}{L} \tag{8}$$

The time difference $\Delta t_s$ will conseqeuntly in reality be directly proportional to $s/L$, that is to the angular displacement of the object from the line of sight 2 as seen from the point of reference 3, provided that the nutation angle $\varphi$ is maintained constant.

According to a further development of the invention the nutation angle $\varphi$ can, however, be varied by suitable means in the projector device 4, for instance in the manner described in the foregoing in connection with FIGS. 11 and 12, so that the nutation angle $\varphi$ is inversely proportional to the distance L from the reference point 3 to the object 1. Then the time difference $\Delta t_s$ will be directly proportional to the linear horizontal displacement $s$ of the object from the line of sight 2 as expressed in units of length.

Figure 4:
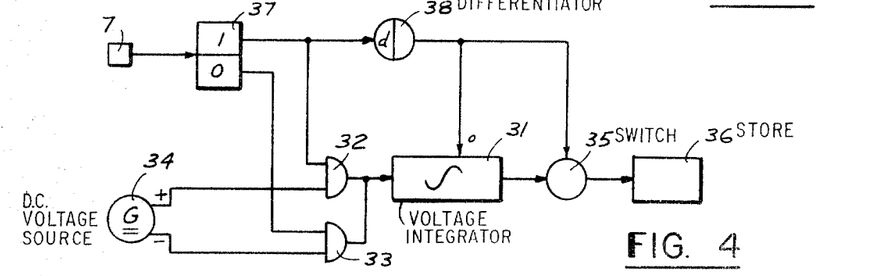
FIG. 4 is a schematic block diagram of a compilation or computer assembly which may be used in connection with an arrangement as illustrated in FIG. 2 for determining the azimuth displacement of the object from the line of sight.

FIG. 4 is a block diagram of a suitable computer or compilation assembly 8 responsive to the output signal of the photocell 7 for determining the time difference $\Delta t_s$. This compilation unit comprising a D.C. voltage integrator 31, to the input terminal of which, alternatively, a positive voltage or an equally large negative voltage from a voltage source 34 can be supplied through two AND-gates 32 and 33. The output voltage from the integrator 31 can be transferred through an electronic switch 35 to a holding or storage circuit 36, which can be provided with suitable instruments indicating the value of the voltage transferred from the integrator 31 and stored in the storage circuit. Alternatively the voltage stored in the storage circuit 36 can be supplied to an automatic guide or control system for guiding the object in dependence of its azimuth displacement from the line of sight. The signal supplied to the electronic switch 35 so that it closes and the voltage value in the integrator 31 is transferred to the storage circuit 36, is also supplied to the integrator 31 for resetting the integrator to a starting or zero value. The two gates 32 and 33 are controlled from a binary circuit 37, which is controlled by the output signal from the photocell 7 and arranged to assume its 1-state and produce a signal on its 1-output when receiving a signal from the photocell 7, that is when the photocell is illuminated, but to assume its 0-state and producing output signals on its 0-output when no signal is received from the photocell 7, that is when the photocell 7 is unilluminated. As the waveform K31 in FIG. 3 shows, a positive input voltage will be supplied to the integrator 31 during the time interval $t_1$–$t_2$, whereas a negative input voltage will be supplied to the integrator during the time interval $t_2$–$t_3$. The integrator 31 is reset, at the same time as its integrated voltage value is transferred to the storage circuit 36, at the instant when the border line R1 passes the photocell 7, that is at the instants $t_1$ and $t_3$ respectively, in that the leading edge of the output signal from the 1-output of the binary circuit 37 is differentiated in a differentiating circuit 38 and supplied to the integrator 31 for the resetting thereof and to the electronic switch 35 for the temporary closing of the switch. The voltage value transferred from the integrator 31 to the storage circuit 36 after one nutation will consequently correspond to the quantity $\Delta t_s$ (compare the Expression 5 in the foregoing) and thus represent the azimuth displacement of the object from the line of sight. Consequently, only one nutation revolution is required for obtaining the value of the azimuth displacement of the object and for each new nuation revolution a new value is obtained for the azimuth displacement of the object.

As mentioned in the foregoing, the second photocell 9 is not used for determining the displacement of the object from the line of sight but only for determining the distance L from the object to the reference point 3, if this distance is unknown. The output signal of this second photocell 9 will during a nutation revolution vary in the manner illustrated by the waveform K9 in FIG. 3. The photocell 9 is illuminated from the instant $t_4$ to the instant $t_5$ and unilluminated from the lastmentioned instant to the instant $t_6$ in the following nutation revolution. The instants $t_4$, $t_5$ and $t_6$ can be derived in the same way as the instants $t_1$, $t_2$ and $t_3$. On the waveform K9 the positions of the pulse edges are indicated in the same way as for the waveform K7. According to the invention one determines during one nutation revolution the time difference between those instants at which the border line R1 and the border line R2, respectively, in the pattern paths the two photocells 7 and 9, that is the lengths of the time intervals $t_1$–$t_4$ and $t_5$–$t_2$ and $t_3$–$t_6$ etc. The waveform K39 in FIG. 3 shows these time intervals. Each of these intervals has the length $$\Delta t_L = k_1 \cdot \frac{d}{r} \qquad (9)$$

If the Expression 7 is used in the above Expression 9 one obtains $$\Delta t_L = k_1 \frac{d}{\varphi \cdot L} \qquad (10)$$

that is the length of the time interval $\Delta t_L$ is inversely proportional to the distance L from the object to the reference point 3, provided that the nutation angle $\varphi$ is maintained constant.

Figure 5:
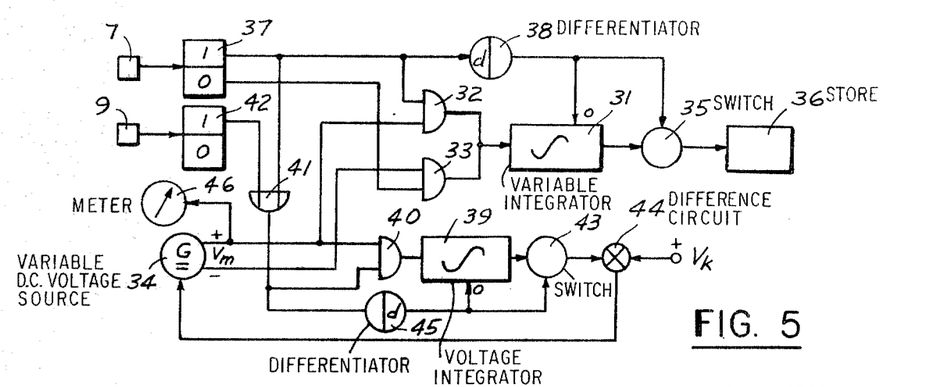
FIG. 5 is a schematic block diagram of a similar compilation or computer assembly usable in connection with the arrangement illustrated in FIG. 2 for determining the azimuth displacement of the object as well as its distance from the reference point.

FIG. 5 is a block diagram for a computer or compilation unit for determining the azimuth displacement $s$ of the object as well as the distance L of the object from the reference point in connection with the arrangement illustrated in FIG. 2. Since this unit is in many ways similar to the unit of FIG. 4, particularly with respect to azimuth computation, like elements will have the same reference numbers and only the differences will be discussed in detail. However, the voltage source 34' is in this case not a constant voltage source but a source of variable voltage, the magnitude of which can be varied in response to a control signal supplied to the voltage source. This makes it possible, as will be fully described in the following, to obtain from the integrator 31 a value upon the linear azimuth displacement of the object expressed in units of length, even if the nutation angle $\varphi$ is maintained constant. In addition to the components and devices present already in the compilation unit according to FIG. 4 as described in the foregoing, the compilation unit in FIG. 5 comprises an additional integrator 39, to which the positive voltage from the variable voltage source 34 can be supplied through an AND-gate 40. This gate is controlled from an OR-gate 41, which has its input terminals connected to the 1-output of the binary circuit 37 and the 1-output binary circuit 42, which is controlled by the output signal of the photocell 9 in such a way that it assumes its 1-state and produces a signal on its 1-output when a signal is received from the photocell 9, that is when the photocell 9 is illuminated. The positive voltage $V_m$ from the controlled voltage source 34' is consequently supplied to the integrator 39 during the time intervals indicated by the waveform K39 in FIG. 3. At the end of each such interval the voltage value in the integrator 39 is transferred through an electronic switch 43 to a comparison or difference circuit 44 and at the same time the integrator 39 is reset. The resetting of the integrator 39 and the temporary closing of the electronic switch 43 is initiated by a signal from a differentiating circuit 45, which differentiates the trailing edge of the pulse from the OR-gate 41. In the comparison circuit 44 the voltage value received from the integrator 39 is compared with a constant voltage $V_k$, and any difference existing between these voltages will generate a control signal from the comparison circuit 44 to the controlled voltage source 34 so that its output voltage is changed in such a direction that the difference is reduced. The voltage transferred to the comparison circuit 44 from the integrator 39 has obviously the value.

$$V_m \cdot \Delta t_L = V_m \cdot k_1 \cdot \frac{d}{\varphi L} \qquad (11)$$

In the comparison circuit 44 this voltage is compared with the constant voltage $V_k$ and the voltage $V_m$ from the voltage source 34' is changed, until the following condition is satisfied $$V_m \cdot k_1 \cdot \frac{d}{\varphi L} - V_k = 0 \qquad (12)$$

This condition will be satisfied when $$V_m = \frac{V_k \cdot \varphi}{k_1 \cdot d} \cdot L = k_2 \cdot L \qquad (13)$$

where $k_2$ is a constant $$k_2 = \frac{V_k \cdot \varphi}{k_1 \cdot d} \qquad (14)$$

The supply voltage $V_m$ will consequently become directly proportional to the distance L from the object 1 to the reference point 3 and can be supplied to an instrument 46 for indicating this distance. As the same supply voltage $V_m$ is used also for the integrator 31 determining the azimuth displacement of the object, the output voltage transferred from the integrator 31 to the storage circuit 36 (compare the Expression 8) will be $$\Delta t_s \cdot V_m = -4k_1 \frac{1}{\varphi} \cdot \frac{s}{L} \cdot k_2 \cdot L = \frac{4k_1 k_2}{\varphi} \cdot s \qquad (15)$$

that is directly representing the linear azimuth displacement $s$ of the object from the line of sight expressed in units of length.

It is understood that a similar system can be used for determining the displacement of the object in the vertical direction from the line of sight, in which case, however, the border lines or directions R1 and R2 in the pattern used must be horizontal and the two photocells 7 and 9 be located vertically above each other, if also the distance to the object is to be determined.

Figure 6:
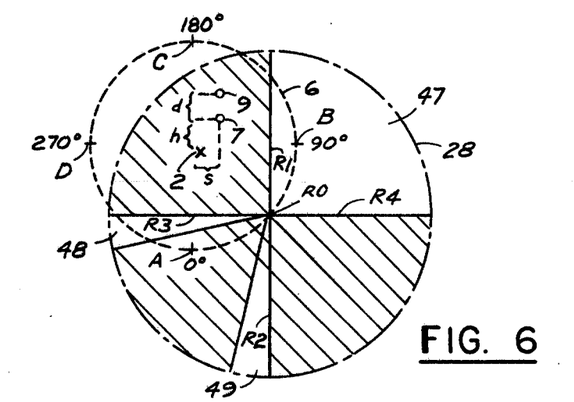
FIG. 6 illustrates schematically the geometry of a pattern, which can be used for determining the azimuth displacement as well as the elevation displacement of an object and, if desired, also the distance of the object from the reference point, and the interaction between the pattern and the photocells respectively on the object.

It is also understood that it will be possible by a system according to the invention to determine both the azimuth displacement as well as the elevation displacement of the object if a pattern is used which defines or indicates two radial vertical directions from the centre of the pattern as well as two radial horizontal directions from the pattern. FIG. 6 illustrates in the same manner as FIG. 2 such a pattern, which can be used for determining the displacement of the object from the line of sight at the same time both in azimuth as well as in elevation. The same reference numbers are used in FIG. 6 as in FIG. 2. The photocell 7 on the object is assumed to have a linear azimuth displacement $s$ and a linear elevation displacement $h$ from the line of sight. The second photocell 9 is located immediately above the photocell 7 at the distance $d$ therefrom. The pattern used consists of three luminous sectors 47, 48 and 49 separated by dark sectors (hatched in the drawing). The luminous sector 47 has a centre angle of 90° and one of its border lines vertical so that it defines or indicates the vertical, upwards extending direction R1 from the centre R0 of the pattern, whereas the other border lines of the sector defines or indicates a horizontal direction R4 extending to the right from the centre R0 of the pattern. The two other sectors 48 and 49 are narrower and so disposed that the one border line of the sector 49 defines the vertical, downwards extending direction R2 from the centre R0 of the pattern, whereas the one border line of the other sector 48 defines a horizontal direction R3 extending to the left from the centre R0 of the pattern. The two remaining border lines of the narrow luminous sectors 48 and 49 have no function for the operation of the system. The positions of these lastmentioned border lines are consequently of minor importance. The sectors 48 and 49 should be as narrow as possible as in this way the total amount of emitted light will be small and at the same time the light dispersion caused by dust and liquid drops in the air is reduced. However, the sectors should not be so narrow that they cannot be detected by the photocells.

Figure 7:
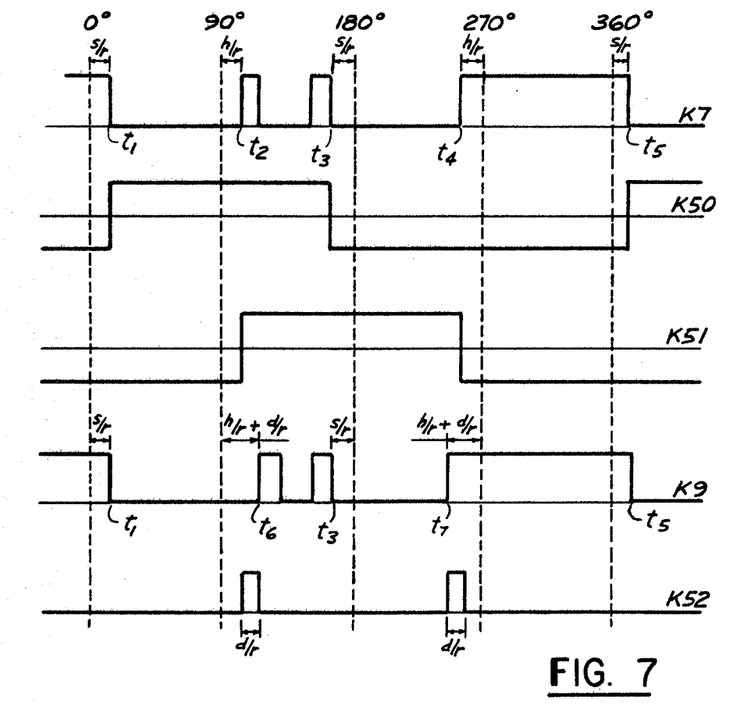
FIG. 7 is a waveform diagram showing the output signals from the two photocells in an arrangement as illustrated in FIG. 6 and the time intervals to be measured for determining the azimuth displacement, the elevation displacement and the distance from the reference point of the object.

The output voltage from the photocell 7 varies as illustrated by the waveform K7 in FIG. 7, $t_1$ being the instant when the border line R1 passes the photocell 7, $t_2$ the instant when the border line R3 passes the photocell, $t_3$ the instant when the border line R2 passes the photocell, $t_4$ the instant when the border line R4 passes the photocell, and $t_5$ the instant when the border line R1 again passes the photocell. These instants have the positions indicated at the waveform K7 in FIG. 7, which can be shown in the same way as previously described in connection with FIG. 2.

According to the invention one determines the difference between the time interval from $t_1$ to $t_3$ and the time interval from $t_3$ to $t_5$, that is $$\Delta t_s = (t_3 - t_1) - (t_5 - t_3) = -4k_1 \cdot \frac{s}{r} \qquad (16)$$

The time difference $\Delta t_s$ is consequently proportional to the azimuth displacement of the object from the line of sight expressed in an angle of deviation as seen from the reference point 3.

Furthermore, one determines also the time difference between the time interval from $t_2$ to $t_4$ and the time interval from $t_4$ to the instant during the following nutation revolution corresponding to the instant $t_2$, that is the difference $$\Delta t_h = (t_4 - t_2) - (2\pi k_1 \div t_2 - t_4) = -4k_1 \cdot \frac{h}{r} \qquad (17)$$

This time difference $\Delta t_h$ is consequently proportional to the elevation displacement $h$ of the object from the line of sight 2 expressed as the deviation angle as seen from the reference point 3.

The output signal of the second photocell 9 will have the waveform K9 as shown in FIG. 7 and the time locations $t_1$, $t_6$, $t_3$, $t_7$ and $t_5$ of the leading and the trailing edges respectively of the pulses will be those indicated at this waveform K9. The instant $t_6$ is the instant when the border line R3 in the pattern passes the photocell 9, whereas $t_7$ is the instant when the other horizontal border line R4 in the pattern passes the photocell 9. According to the invention one determines the time interval between the instants $t_2$ and $t_6$ when the border line R3 passes the photocells 7 and 9, respectively, and also the time interval between the instants $t_4$ and $t_7$ when the other horizontal border line R4 passes the two photocells 7 and 9. Each of these time intervals has the value $$\Delta t_L = k_1 \cdot \frac{d}{r} = k_1 \cdot \frac{d}{\varphi L} \qquad (18)$$

that is, the time difference $\Delta t_L$ is inversely proportional to the distance L from the object to the reference point.

If a computer or compilation unit controlled by the output signals from the photocells 7 and 9 shall be able to determine the above given time differences, which represent the azimuth displacement $s$, the elevation displacement $h$ and the distance L to the reference point respectively of the object, the compilation unit must be able to determine from which one of the border lines R1–R4 in the pattern that each specific pulse edge emanates. This is made possible in that the compilation unit counts during each nutation revolution the number of pulse edges received after a predetermined starting point for the nutation revolution. In order to do this the compilation unit must, however, be able to detect a predetermined starting point for each nutation revolution. According to the invention this is possible in that the pattern is rotationally unsymmetric about its centre. The pattern illustrated in FIG. 6 is rotationally unsymmetric about its centre R0 in that the luminous sector 47 is considerably broader than the luminous sectors 48 and 49. Consequently, the luminous sector 47 causes a considerably longer pulse in the output signal from the photocell 7 than the two narrow sectors 48 and 49. By measuring the length of the pulses in the output signals from the photocell 7 the compilation unit can detect when the longer pulse from the larger sector 47 appears and determine, for instance, the end of this longer pulse, that is the instant $t_1$ constitutes the starting point for the nutation revolution, from which starting point the compilation unit subsequently counts the number of pulse edges received. It is understood that also the pattern shown in FIG. 2 and previously discussed is rotationally unsymmetric about its centre R0.

Figure 8:
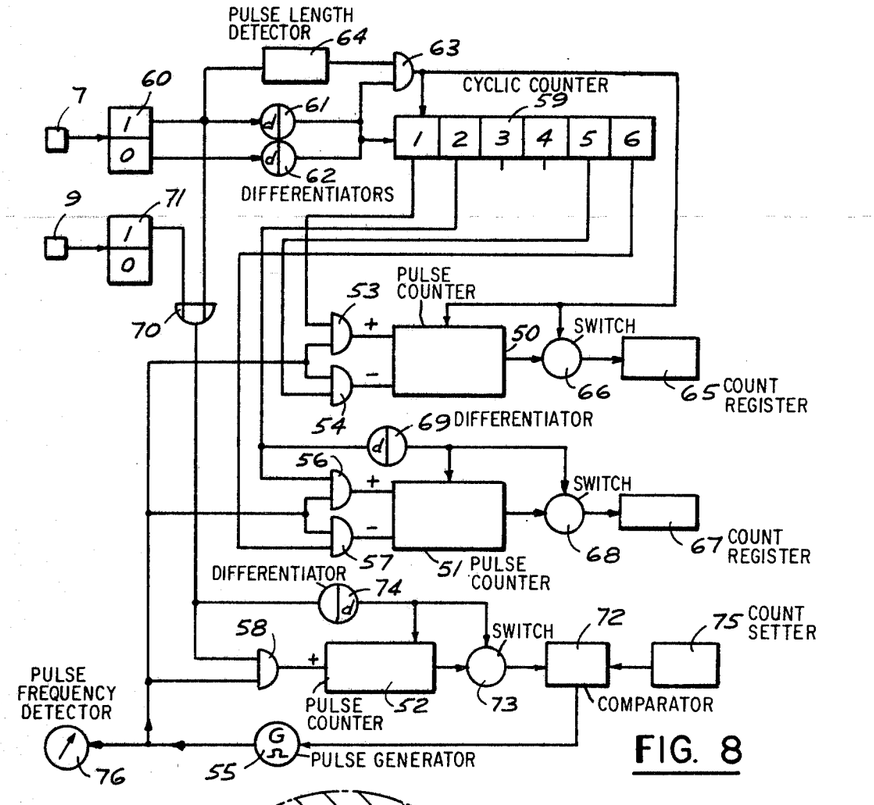
FIG. 8 is a block diagram for a compilation or computer assembly which can be used in connection with the arrangement illustrated in FIG. 6 for determining the azimuth displacement, the elevation displacement and the distance from the reference point of the object.

FIG. 8 is a block diagram for a compilation unit, which may be used in conjunction with the pattern shown in FIG. 6. This compilation unit is in principle designed in the same way as the previously described compilation unit shown in FIG. 5, with the exception that the compilation unit in FIG. 8 is arranged to determine the azimuth displacement as well as the elevation displacement of the object and that the time measuring devices consist of pulse counters instead of voltage integrators.

The compilation unit in FIG. 8 comprises a first pulse counter 50 for determining the azimuth displacement, a second pulse counter 51 for determining the elevation displacement and a third pulse counter 52 for determining the distance from the object to the reference point. The two pulse counters 50 and 51 are of a type capable of counting upwards as well as downwards, i.e. "up-down" counters, and each counter has a first input (+) for pulses when counting upwards and a second input (−) for pulses when counting downwards. The pulse counter 52, however, can only count upwards. Pulses are supplied to the counter 50 for up-counting or down-counting, respectively, from a pulse generator 55 with variable pulse frequency through two AND-gates 53 and 54. In the same way pulses are supplied from the pulse generator 55 to the counter 51 for up-counting or down-counting respectively through two AND-gates 56 and 57. Pulses from the generator 55 can be supplied to the counter 52 for up-counting through an AND-gate 58. The gates 53, 54, 56 and 57 are controlled by signals from a cyclic or ring counter 59, which is controlled by the output signals from the photocell 7 and which can count to SIX and thereafter returns to ONE. The output signal from the photocell 7 is supplied to a binary circuit 60, which assumes its 1-state and provides a signal on its 1-output when receiving an input signal from the photocell 7, that is when the photocell is illuminated, whereas it assumes its 0-state and provides a signal on its 0-output, when no signal is received from the photocell 7, that is when the photocell is unilluminated. The outputs of the binary circuit 60 are connected to differentiating circuits 61 and 62 respectively, which differentiate the leading edges of the output signals from the binary circuit 60 and consequently produce a short pulse each time the binary circuit 60 switches state, that is for each pulse edge in the output signal from the photocell 7. The output pulses from the differentiating circuits 61 and 62 are supplied as stepping pulses to the cyclic counter 59. During each nutation revolution a sync signal is also supplied to the cyclic counter 59. This sync signal resets the counter to its ONE-position, if the counter should be in any other position. This sync signal is supplied from an AND-gate 63, which is controlled on one of its input terminals by the pulses from the differentiating circuits 61 and 62 and on its other input terminal by the output signal from a pulse length detecting circuit 64, to which the output signal from the 1-output of the binary circuit 60 is supplied. The pulse length detecting circuit 64 is adapted to provide a signal on its output, when a pulse having a length exceeding a predetermined pulse length is supplied to the input of the circuit. The circuit 64 is designed to provide an output signal only when the longer pulse in the output signal from the photocell 7 emanating from the large luminous sector 47 in the pattern is supplied to the circuit (compare waveform K7 in FIG. 7). Consequently, a sync signal is supplied to the cyclic counter 59 for resetting the counter to its ONE-position at the instant $t_1$ during each nutation revolution. Thereafter the counter is driven by the pulses from the differentiating circuits 61 and 62, whereby the counter will assume its TWO-position at the instant $t_2$, its FIVE-position at the instant $t_3$, its SIX-position at the instant $t_4$ and again its ONE-position at the instant $t_5$ etc. The ONE-output and the FIVE-output of the cyclic counter 59 are connected to the gates 53 and 54 on the input side of the counter 50, whereby pulses are supplied from the generator 55 to the counter 50 for up-counting during the time interval $t_1$ to $t_3$, whereas pulses are supplied to the counter for down-counting during the time interval from $t_3$ to $t_5$ as indicated schematically by the waveform K50 in FIG. 7. At the instant $t_1$ (respectively $t_5$) during each nutation revolution the counter 50 will consequently contain a count corresponding to $$\Delta t_s \cdot F_m = -4k_1 \frac{s}{r} F_m \qquad (19)$$

where $F_m$ is the frequency of the pulse generator 55. This count is consequently proportional to the azimuth displacement $s$ of the object and is transferred from the counter 50 to a register 65 through a temporarily closed electronic switch 66. Simultaneously the counter 50 is reset. The resetting of the counter 50 and the closing of the electronic switch 66 is effected by the sync pulse from the gate 63, which sync pulse appears at the instant $t_1$ during each nutation revolution.

The gates 56 and 57 are controlled from the TWO-output and the SIX-output respectively of the cyclic counter 59, whereby pulses are supplied to the counter 51 for up-counting during the time interval $t_2$ to $t_4$, whereas pulses are supplied to the counter for down-counting during the time intreval from $t_4$ to the instant corresponding to the instant $t_2$ during the following nutation revolution as indicated by the waveform K51 in FIG. 7. At the instant $t_2$ during each nutation revolution the counter 51 will consequently contain a count corresponding to $$\Delta t_h \cdot F_m = -4k_1 \frac{h}{r} \cdot F_m \qquad (20)$$

This count is consequently proportional to the elevation displacement $h$ of the object and is transferred at the instant $t_2$ to a register 67 through a temporarily closed electronic switch 68. Simultaneously the counter 51 is reset. The resetting of the counter 51 and the closing of the electronic switch 68 is effected by a signal from a differentiating circuit 69, which differentiates the leading edge of the output signal from the TWO-output of the cyclic counter 59. This leading edge appears at the instant $t_2$ during each nutation revolution (compare FIG. 7).

The gate 58 is controlled from an OR-gate 70, which is controlled from the 1-outputs of the binary circuit 60 and a binary circuit 71. The binary circuit 71 is controlled from the photocell 9 in such a way that it assumes its 1-state and provides a signal on its 1-output, when receiving a signal from the photocell 9, that is when the photocell is illuminated. Consequently, pulses from the generator 55 are supplied to the counter 52 during the time intervals $t_2$ to $t_6$ and $t_7$ to $t_4$ during each nutation revolution, as indicated schematically by the waveform K52 in FIG. 7. After each one of these intervals the counter 52 contains a count corresponding to $$\Delta t_L \cdot F_m = k_1 \cdot \frac{d}{\varphi \cdot L} \cdot F_m \qquad (21)$$

This count is transferred to a comparator 72 through a temporarily closed electronic switch 73. Simultaneously the counter 52 is reset. The resetting of the counter and the closing of the switch 73 is effected by a signal from a differentiating circuit 74, which differentiates the trailing edge of the output pulse from the OR-gate 70. A fixed predetermined count $B_k$ is also supplied to the comparator 72 from a count setter 75. The comparator 72 compares the two counts supplied to it and provides, if a difference exists between the two counts, a control signal for the pulse generator 55. In response to this control signal the pulse frequency of the pulse generator 55 is changed in such a way that the following condition is satisfied:

$$k_1 \cdot \frac{d}{\varphi \cdot L} F_m = B_k \qquad (22)$$

In this way the frequency $F_m$ of the pulse generator 55 is automatically maintained on the value $$F_m = \frac{B_k \cdot \varphi}{k_1 \cdot d} \cdot L \qquad (23)$$

that is the pulse frequency $F_m$ of the generator 55 will be proportional to the distance $L$ of the object from the reference point. The output signal of the pulse generator 55 is supplied to a pulse frequency detecting instrument 76 indicating the distance $L$ from the object to the reference point. As the output signal of the pulse generator 55 having the pulse frequency $F_m$ is supplied also to the counters 50 and 51, the counts transferred from these counters 50 and 51 to the registers 65 and 67, respectively, will obviously represent the linear displacements in azimuth and elevation, respectively, of the object from the line of sight 2 as expressed in units of length. If the azimuth and elevation displacement of the object are to be measured in displacement angles as seen from the reference point 3, a pulse generator with constant frequency is used for feeding pulses to the counters 50 and 51.

It is understood that a compilation unit of FIG. 8 for evaluating and analysing the output signals of the photocells 7 and 9 in an arrangement as illustrated in FIGS. 6 and 7 can just as well consist of voltage integrators in a similar manner as the compilation units shown in FIGS. 4 and 5, and that a compilation unit for evaluating and analysing the output signals from the photocells 7 and 9 in connection with an arrangement as illustrated in FIG. 2 can consist of pulse counters. Of course, it is also possible to use any other suitable time measuring devices.

In the embodiments of the invention described in the foregoing the pattern has such a geometry that the various radial directions from the centre of the pattern are defined or indicated by border lines between luminous and dark portions in the pattern coinciding with said directions. The various directions in the pattern can, however, also be indicated or defined in that the pattern comprises narrow luminous sectors extending from the centre of the pattern and so disposed that the centre lines in the sectors are coinciding with the predetermined directions in the pattern. In this case the various time intervals to be determined are not measured from the edges of the pulses in the output signals from the photocells but instead from the pulse centres, which can be easily detected by suitable means in the compilation unit, particularly as the pulses are in this case very short. When determining the displacement of the object from the line of sight both in azimuth as well as in elevation it is, furthermore, not necessary to define or indicate four different directions in the pattern, as the directions R1, R2, R3, R4 in the pattern in FIG. 6, but it is quite sufficient to indicate only three of these directions.

Figure 9:
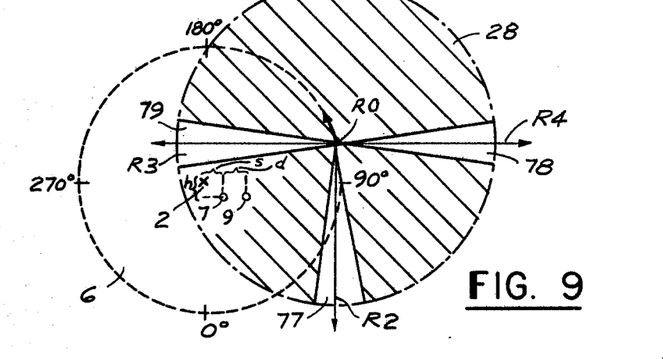
FIG. 9 illustrates the geometry of still another pattern, which can be used for determining the azimuth displacement, the elevation displacement and the distance from the reference point of an object, and the interaction between the pattern and the photocells on the object.

FIG. 9 shows in a similar manner as FIGS. 2 and 6 a pattern for determining the azimuth displacement as well as the elevation displacement of an object, in which pattern only three radial directions R2, R3 and R4 from the centre R0 of the pattern are indicated by means of three narrow luminous sectors 77, 78 and 79 respectively having their centre lines coinciding with the directions R2, R3 and R4 respectively. The other reference numerals used in FIG. 9 correspond to those used in FIGS. 2 and 6.

Also this pattern is rotationally unsymmetric about its centre R0 so that the compilation unit can keep track of the different pulses and detect the starting point of each nutation revolution. This pattern is particularly advantageous in that it can be generated by a beam of light containing a very small total amount of light.

Figure 10:
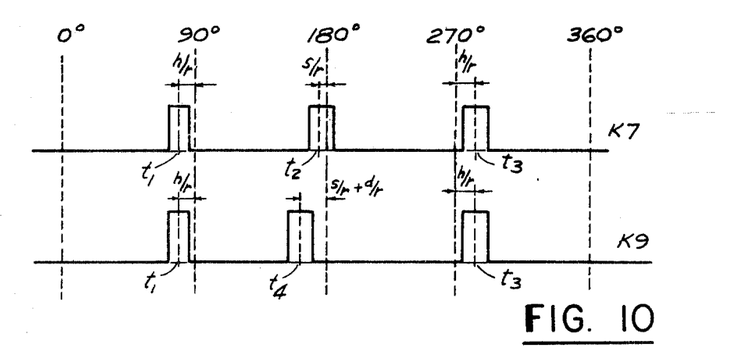
FIG. 10 is a waveform diagram showing the output signals from the two photocells in connection with the arrangement illustrated in FIG. 9.

The output signal of the photocell 7 will vary as illustrated by the waveform K7 in FIG. 10, where $t_1$ is the instant when the direction R3, that is the centre line in the luminous sector 79, passes the photocell 7, whereas $t_2$ is the instant when the direction R2 passes the photocell 7, and $t_3$ is the instant when the direction R4 passes the photocell 7. These instants will have the time positions indicated at the waveform K7 in FIG. 10. When this pattern is used, one determines the difference between the time interval from $t_1$ to $t_3$ and the time interval from $t_3$ to the instant in the following nutation revolution corresponding to the instant $t_1$. This time difference has the value $$\Delta t_h = 4k_1 \frac{h}{r} \quad (24)$$

and is consequently proportional to the elevation displacement $h$ of the object.

One also determines the difference between the time interval $t_1$ to $t_2$ and the time interval $t_2$ to $t_3$. This difference will have the value $$\Delta t_s = -2k_1 \frac{s}{r} \quad (25)$$

and is consequently proportional to the azimuth displacement $s$ of the object.

The two time difference $\Delta t_h$ and $\Delta t_s$ can be determined by time measuring devices comprising voltage integrators or pulse counters in the same manner as described in the foregoing in connection with FIGS. 4, 5 and 8. However, the integrator or pulse counter determining the azimuth displacement of the object must be fed by a supply voltage or a pulse frequency, respectively, which is twice as large as the supply voltage or pulse frequency, respectively, supplied to the voltage integrator or pulse counter determining the elevation displacement of the object.

The output signal of the second photocell 9 will vary as indicated by the wave form K9 in FIG. 10, in which $t_1$ is the instant when the direction R3 passes the photocell 9, $t_4$ is the instant when the direction R2 passes the photocell 9 and $t_3$ is the instant when the direction R4 in the pattern passes the photocell 9. For determining the distance from the object to the reference point 3 one determines during each nutation revolution the time interval $t_4$ to $t_2$, that is the time interval between the instants when the direction $R_2$ in the pattern passes the photocells 7 and 9. This time interval has the value $$\Delta t_L = k_1 \frac{d}{r} = k_1 \frac{d}{\varphi \cdot L} \quad (26)$$

and is consequently inversely proportional to the distance L from the reference point to the object in the same way as in the embodiments of the invention previously described. This time interval can consequently be analysed and utilized in the manner described in the foregoing for obtaining a value upon the distance L to the object.

What is claimed is:

1. A system for determining the displacement of an object from a line of sight extending from a point of reference remotely located from the object, characterized in that it comprises a projector device located in said reference point for emitting a beam of light circularly conically nutating about said line of sight but non-rotating about its own axis and producing at a distance substantially corresponding to the distance from said reference point to the object an image of a pattern consisting of luminous and dark portions, said pattern being rotationally unsymmetric about a centre in the pattern and having a geometry indicating at least a first radial direction from the said centre of the pattern and a second radial direction from said centre of the pattern, said second direction being displaced 180° from said first direction, a first photosensitive device disposed on the object for generating an output signal pulse modulated in dependence of the movement of luminous and dark portions of said pattern across the photosensitive device, and first time measuring means responsive to said output signal for determining during a nutation revolution the difference between the time interval from the instant when said first direction in said pattern passes said photosensitive device to the instant when said second direction in said pattern passes said photosensitive device and the time interval from said last mentioned instant when said first direction in said pattern again passes said photosensitive device and for generating an output proportional to said difference.

2. A system as claimed in claim 1 for determining the displacement of the object from the line of sight in two mutually perpendicular directions, characterized in that said pattern has a geometry indicating also a third and a fourth radial direction from said centre of the pattern, said third and fourth directions being displaced 180° from each other and 90° from said first and second directions in the pattern, and comprising second time measuring responsive to the output signal of said photosensitive device for determining during a nutation revolution the difference between the time interval from the instant when said third direction in said pattern passes said photosensitive device to the instant when said fourth direction in said pattern passes said photosensitive device and the time interval from said last mentioned instant to the instant when said third direction in said pattern again passes said photosensitive device and for generating an output proportional to said difference.

3. A system as claimed in claim 1 for determining the displacement of the object from the line of sight in two mutually perpendicular directions, wherein said pattern has a geometry indicating also a third radial direction from said centre of the pattern, said third direction being displaced 90° from said first and second directions in the pattern, and comprising second time measuring means responsive to the output signal of said photosensitive device for determining during a nutation revolution the difference between the time interval from the instant when said first direction passes said photosensitive device to the instant when said third direction in the pattern passes the photosensitive device and the time interval from said last mentioned instant to the instant when said second direction in the pattern passes the photosensitive device and for generating an output proportional to said difference.

4. A system as claimed in claim 1, wherein said pattern comprises border lines between luminous and dark portions coinciding with said directions in the pattern.

5. A system as claimed in claim 1, wherein said pattern comprises narrow luminous sectors extending from said centre in the pattern in said directions.

6. A system as claimed in claim 1, wherein said pattern comprises a luminous portion and a dark portion separated by a border line coinciding with said first and second directions in the pattern.

7. A system as claimed in claim 2, wherein said pattern comprises a first luminous sector having a centre angle of 90° and border lines coinciding with said first and fourth directions in the pattern and two substantially narrower luminous sectors extending along said second and third directions in the pattern.

8. A system as claimed in claim 3, wherein said pattern comprises three narrow luminous sectors extending along said first, second and third directions in the pattern.

9. A system as claimed in claim 1, wherein said projector device comprises means for variation of the angle of nutation in inverse proportion to the distance from said reference point to the object.

10. A system as claimed in claim 1, for determining also the distance from the reference point to the object, comprising a second photosensitive device disposed on the object spaced from said first photosensitive device in such a way that the connecting line between said first and second photosensitive devices is perpendicular to one of said directions in said pattern, and additional time measuring means responsive to the output signals from said first and second photosensitive devices for determining during a nutation revolution the length of the time interval between the instants when said direction in the pattern passes said first and second photosensitive devices and for generating an output proportional to the inverse value of said time interval.

11. A system as claimed in claim 10, wherein the output of said additional time measuring means is supplied to said first time measuring means, and said first time measuring means is arranged to produce an output proportional to the product of the time difference determined by it and the output from said additional time measuring means.

12. A system as claimed in claim 1, wherein said first time measuring means comprises a voltage integrator and switching means responsive to the output signal from said first photosensitive device for connecting a positive voltage to said integrator during one of said time intervals, between which said time measuring device is to determine the difference, and for connecting an equally large negative voltage to the integrator during the other one of said time intervals.

13. A system as claimed in claim 10, wherein said first time measuring means comprise a first voltage integrator and first switching means responsive to the output signal from said first photosensitive device for connecting a positive voltage to said first integrator during one of said time intervals, between which said first time measuring means are to determine the difference, and for connecting an equally large negative voltage to said first integrator during the other one of said time intervals, and said additional time measuring means comprise a second voltage integrator and second switching means responsive to the output signals from said first and second photosensitive devices for connecting a voltage from a variable voltage source to said second integrator during the time intervals, the length of which said additional time measuring means are to determine, and means for comparing the output voltage of said second integrator at the end of each such time interval with a constant reference voltage and for controlling said voltage source in such a way that the value of the output voltage of said second integrator is made equal to the value of said reference voltage, said positive and negative voltages connected to said first voltage integrator in said first time measuring means being derived from the output voltage of said variable voltage source.

14. A system as claimed in claim 1, wherein said first time measuring means comprises a pulse counter having a first pulse input for counting upwards and a second pulse input for counting downwards and switching means responsive to the output signal of said first photosensitive device for connecting a pulse train of a predetermined pulse frequency to said first input of said counter during one of said time intervals, between which said time measuring device is to determine the difference, and for connecting said pulse train to said second input of the counter during the other one of said time intervals.

15. A system as claimed in claim 10, wherein said first time measuring means comprise a first pulse counter having a first pulse input for counting upwards and a second pulse input for counting downwards and first switching means responsive to the output signal of said first photosensitive device for connecting a pulse train from a pulse generator having a variable pulse frequency to said first input of said first counter during one of said time intervals, between which said first time measuring means are to determine the difference, and for connecting said pulse train to said second input of said second counter during the other one of said time intervals, and said additional time measuring means comprise a second pulse counter and second switching means responsive to the output signals from said first and second photosensitive devices for connecting said pulse train to said second counter during the time intervals, the length of which said additional time measuring means are to determine, and means for comparing the count of said second counter at the end of each such time interval with a fixed reference count and for controlling the pulse frequency of said pulse generator in such a way that said count in said second counter and said reference count are made to coincide.

16. A system as claimed in claim 1, wherein said projector device comprises a stationary reticle having luminous and dark portions corresponding to said luminous and dark portions of said pattern, an objective for focusing an image of said reticle at a substantial distance from said projector device, and a prism assembly disposed between said reticle and said objective and rotatable about the optical axis of said objective, said prism assembly including two plane, mutually parallel and axially spaced refracting surfaces forming an acute angle with said optical axis.

17. A system as claimed in claim 16, wherein the mutual axial distance between said refracting surfaces of said prism assembly is variable.

18. A system as claimed in claim 16, wherein the angle between said refracting surfaces and said optical axis is variable.

19. A system as claimed in claim 17, wherein said prism assembly comprises two identical triangular prisms disposed after one another in the direction of the optical axis at a mutual distance, which may be varied.

20. A system as claimed in claim 18, wherein said prism assembly consists of a plane parallel prism pivotable about an axis perpendicular to the optical axis and parallel to the refracting surfaces of the prism.

21. A system as claimed in claim 16, wherein said reticle consists of a disk with transparent and opaque portions, and comprising a light source and a condenser lens for illuminating said reticle disk from the side opposite to said objective, and a second prism assembly similar to said first prism assembly disposed between said condenser and said reticle disk.

22. A system as claimed in claim 21, wherein said condenser lens has variable focal length.

References Cited
UNITED STATES PATENTS

| | | | |
|---|---|---|---|
| 3,139,246 | 6/1964 | Willits | 250—234 X |
| 3,378,687 | 4/1968 | Schepler | 250—236 X |
| 3,422,548 | 1/1969 | Waldhauer | 250—203 X |

RAYMOND F. HOSSFELD, Primary Examiner

C. R. CAMPBELL, Assistant Examiner

U.S. Cl. X.R.

244—1, 14; 250—209, 234, 235